H. M. DAWLEY.
HEADLIGHT CONSTRUCTION FOR VEHICLES.
APPLICATION FILED FEB. 1, 1913.

1,096,802.

Patented May 12, 1914.

2 SHEETS—SHEET 1.

Witnesses.
A. G. Dimond.
A. Borkenhagen.

Inventor.
Herbert M. Dawley
By Wilhelm, Parker & Hall, Attorneys.

H. M. DAWLEY.
HEADLIGHT CONSTRUCTION FOR VEHICLES.
APPLICATION FILED FEB. 1, 1913.
1,096,802.
Patented May 12, 1914.
2 SHEETS—SHEET 2.
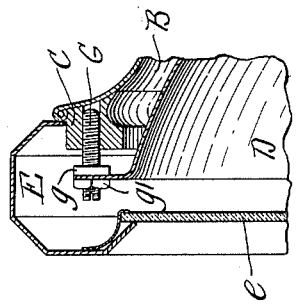
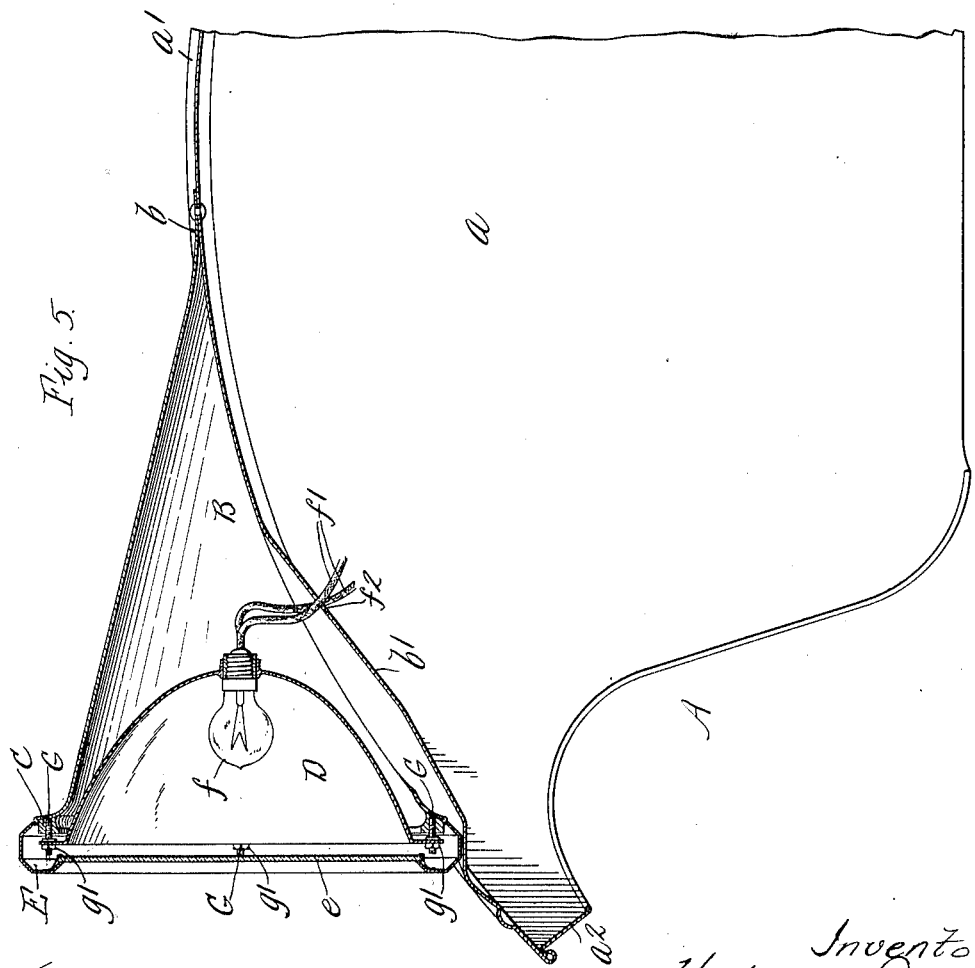
Witnesses
A. G. Dimond
A. Birkenhagen
Inventor
Herbert M. Dawley
By Wilhelm Parker & Hast
Attorneys

UNITED STATES PATENT OFFICE.

HERBERT M. DAWLEY, OF BUFFALO, NEW YORK.

HEADLIGHT CONSTRUCTION FOR VEHICLES.

1,096,802. Specification of Letters Patent. Patented May 12, 1914.

Application filed February 1, 1913. Serial No. 745,538.

*To all whom it may concern:*

Be it known that I, HERBERT M. DAWLEY, a citizen of the United States, residing at Buffalo, in the county of Erie and State of New York, have invented a new and useful Improvement in Headlight Constructions for Vehicles, of which the following is a specification.

This invention relates to improvements in the construction and arrangement of head lights or front lamps for automobiles or motor propelled vehicles, more especially of the sort used for pleasure purposes.

In the more common types of pleasure cars in use at the present time mud guards are provided for both the front and rear wheels, and the head lights or front lamps are mounted at the front end of the vehicle between the projecting front ends of the front mud guards on suitable brackets or supports provided for the purpose. This arrangement locates the head lights relatively low and close together, and thereby proportionately reduces the area of the road illuminated by the beams of light from the lamps.

The objects of this invention are to provide a construction wherein the head lights or lamps at the front end of the vehicle are mounted directly on or formed with the front mud guards of the vehicle; and also to accomplish this in a way which will produce an efficient and desirable head light arrangement and give a distinctive and attractive appearance to the vehicle. To this end the front mud guards are provided or formed at their upper front portions with hood-like shells or hollow protruding portions which form the inclosing casings or housings of the front lamps or head lights.

Figure 1:
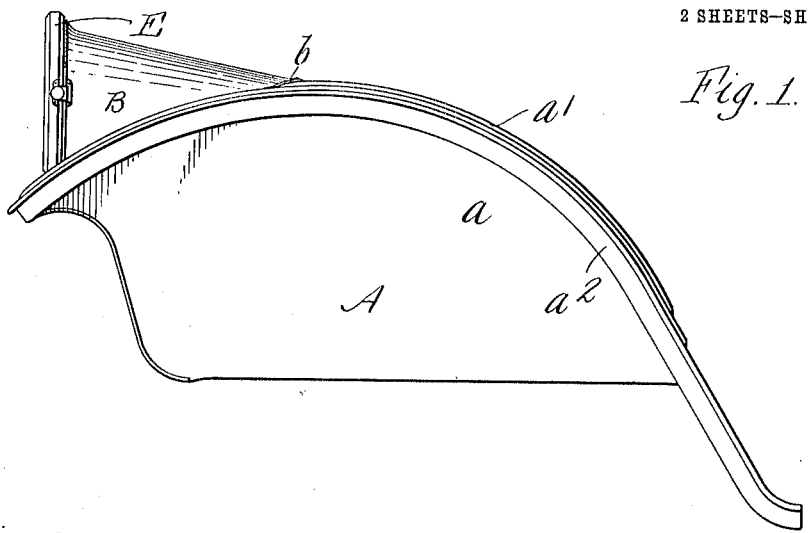
Figure 2:
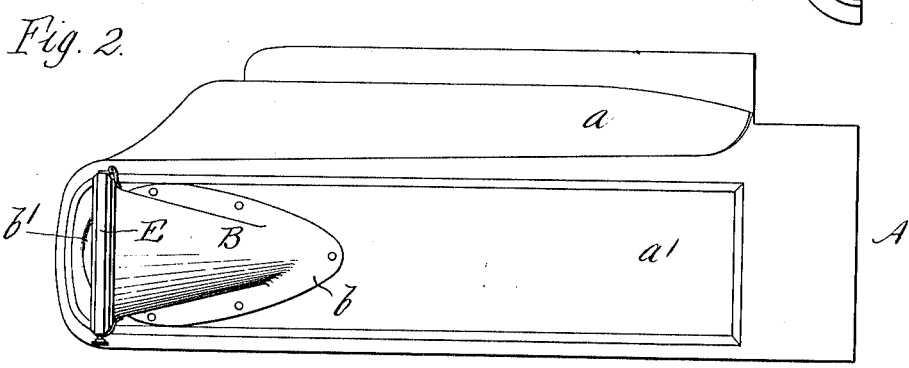
Figure 3:
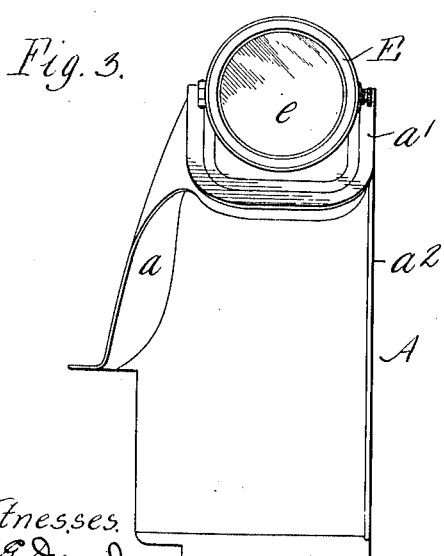
Figure 4:
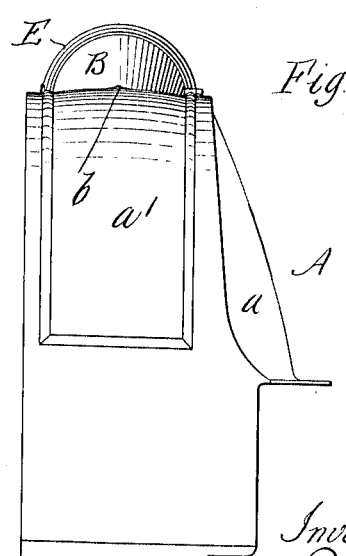

In the accompanying drawings, consisting of two sheets: Figure 1 is a side elevation of a mud guard and head light embodying the invention. Fig. 2 is a plan view thereof. Figs. 3 and 4 are, respectively, front and rear elevations thereof. Fig. 5 is a fragmentary, longitudinal, sectional elevation on an enlarged scale thereof. Fig. 6 is a sectional elevation on a larger scale showing one of the adjusting devices for the reflector. Fig. 7 is a detached view of one of the reflector adjusting screws.

Like reference characters refer to like parts in the several figures.

A represents one of the front mud guards for a motor vehicle. This mud guard, except as hereinafter explained, may be of the usual form and construction, the guard shown being made of sheet metal and having the usual upright portion $a$ which is secured at its lower edge to the frame or body of the vehicle and extends upwardly therefrom between the vehicle body and the front wheel, and the top portion $a'$ which projects laterally outwardly from the upper edge of the upright portion $a$ over the front wheel and is curved more or less in conformity to the curvature of the wheel.

$a^2$ is the usual finishing and strengthening flange depending from the margin of the curved top portion of the guard.

In so far as this invention is concerned, the described form of the mud guard is not essential and the top portion $a'$ may be of any suitable form and may be secured to the vehicle in any suitable manner.

B represents a metal housing shell or hollow protruding portion on the front end portion of the curved top $a'$ of the mud guard. This shell B is preferably of hood-like shape having an open bottom and front and projects upwardly and forwardly from the downwardly curved front end portion of the curved top $a'$ of the mud guard and flares or increases in diameter forwardly substantially in the form of a trumpet, the top line of the shell being substantially tangential to the curved top $a'$ of the guard. It may be secured on the mud guard by a marginal flange $b$ at its lower edge riveted to the mud guard, or it may be secured in any other suitable way to the guard or formed by an integral part of the mud guard. The protruding shell B and an underlying part which is preferably an integral portion of the curved top $a'$ of the mud guard form the outer or inclosing casing of the head light or lamp, the curved top $a'$ of the guard being preferably depressed, as shown at b', Fig. 5, beneath the shell to provide sufficient room for the reflector of the lamp.

With the exception of the inclosing casing of the lamp formed as above described, the lamp may be of any usual or suitable construction, and either an electric, gas or other kind of lamp may be used. In the construction shown, the shell B is provided at its large front end with a circular ring C to which the reflector D of the lamp and the frame E for the glass front or lens e of the lamp are secured. The lens frame E may be hinged or otherwise secured to the casing to permit the lamp to be opened. An electric lamp is illustrated, the incandescent bulb $f$ of which is shown as being secured in a socket in the rear end of the reflector D. The electric conductors $f'$ for the lamp can extend from the lamp socket through a suitable opening $f^2$ in the top $a'$ of the mud guard, or they can be led from the lamp in any other suitable way. The reflector D of the lamp is preferably mounted so that it can be adjusted to the proper position in the casing. This is desirable, since the mud guard is secured in fixed position on the vehicle, and the mud guards on opposite sides of a vehicle or on different vehicles are apt to vary slightly in position or location, thus requiring the reflectors to be adjusted in the casings in order to properly focus the lamps to insure that the rays of light will be projected in the proper direction. The means shown for this purpose consist of screws G which are screwed into threaded holes in the casing ring C and are provided with collars $g$ against which the flanged front end of the reflector is secured by nuts $g'$ screwed on the threaded outer ends of the screws. The outer ends of the screws are slotted, or they may be otherwise fashioned for the engagement of a screw driver or other tool for turning the screws. By loosening the securing nuts $g'$ and turning the screws inwardly or outwardly the reflector can be adjusted to the required position in the lamp casing. Any other suitable means for adjustably securing the reflector in the casing may be employed.

By locating the head lights or front lamps on the mud guards, as explained, the two lamps of the vehicle are spaced considerably farther apart and at a higher elevation than when they are placed in the usual position between the projecting front ends of the mud guards. The beams of light from the lamps, therefore, illuminate the road for a greater distance ahead of the vehicle and to a greater width than by the former arrangement of the lamps, and this location of the lamps is also very desirable in that they illuminate the road to much better advantage in turning the vehicle than is possible with the closer arrangement of the lamps. The described construction and arrangement of the head lights or lamps also obviates the necessity for supporting brackets or devices for the lamps, and the described formation and location of the shells forming the lamp casings produce a very distinctive and attractive appearance.

I claim as my invention:

1. The combination of a mud guard for the wheels of vehicles having a top which is adapted to extend over the wheel and has a curved forward portion, and a rearwardly tapering lamp housing which is arranged directly upon said curved forward portion of the top of the mud guard in a substantially tangential relation thereto, substantially as set forth.

2. A mud guard for the wheels of vehicles having a curved top adapted to extend over the wheel and provided at its front portion with an open-bottomed protruding hood having its lower edges secured to the top of the mud guard and adapted to inclose a lamp, substantially as set forth.

3. The combination with a mud guard for the wheels of vehicles having a portion which extends over the wheel, of a lamp supported on the front portion of said mud guard, and an inclosing casing for said lamp which is formed at least in part by an open-bottomed hood having its lower edges secured to said mud guard, substantially as set forth.

4. The combination with a mud guard for the wheels of vehicles having a top extending over the wheel, of an open-bottomed hood secured at its lower edge on the front portion of the top of said mud guard and forming with the underlying portion of said top of the mud guard an inclosing casing for a lamp, and a lamp in said casing, substantially as set forth.

5. The combination with a mud guard for the wheels of vehicles adapted to extend over the wheel, of an open bottomed hood which projects upwardly from the front portion of said mud guard, and a lamp supported beneath said hood, substantially as set forth.

6. The combination with a mud guard for the wheels of vehicles having a curved top extending over the wheel, of a hood secured on said top, the top of said hood projecting substantially tangentially from said top of the mud guard, and a lamp supported beneath said hood, substantially as set forth.

7. The combination with a mud guard for the wheels of vehicles adapted to extend over the wheel, of a lamp having a casing formed rigidly with said mud guard, a reflector which supports the lamp, and means for adjusting said reflector and the lamp to different positions in said casing, substantially as set forth.

8. The combination with a mud guard for the wheels of vehicles having a curved top extending over the wheel, of an open-bottomed hood projecting substantially tangentially upward from the front portion of said top, and a lamp the inclosing casing of which is formed at least in part by said hood, substantially as set forth.

Witness my hand, this 28th day of January, 1913.

HERBERT M. DAWLEY.

Witnesses:
C. W. PARKER,
A. L. McGEE.